United States Patent
Ahn et al.

(10) Patent No.: US 11,516,026 B2
(45) Date of Patent: Nov. 29, 2022

(54) SECURITY DEVICE GENERATING KEY BASED ON PHYSICALLY UNCLONABLE FUNCTION AND METHOD OF OPERATING THE SAME

(71) Applicant: SAMSUNG ELECTRONICS CO., LTD., Suwon-si (KR)

(72) Inventors: Kyoungmoon Ahn, Seoul (KR); Yongsoo Kim, Osan-si (KR); Yongki Lee, Suwon-si (KR); Yunhyeok Choi, Hwaseong-si (KR); Bohdan Karpinskyy, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 17/014,418

(22) Filed: Sep. 8, 2020

(65) Prior Publication Data
US 2021/0250189 A1    Aug. 12, 2021

(30) Foreign Application Priority Data
Feb. 12, 2020  (KR) .................. 10-2020-0017145

(51) Int. Cl.
*H04L 9/40*    (2022.01)
*H04L 9/32*    (2006.01)
*H04L 9/08*    (2006.01)
*G06F 21/64*   (2013.01)

(52) U.S. Cl.
CPC ............ *H04L 9/3278* (2013.01); *G06F 21/64* (2013.01); *H04L 9/0869* (2013.01)

(58) Field of Classification Search
CPC ...... H04L 9/3278; H04L 9/0869; G06F 21/64
See application file for complete search history.

(56) References Cited

U.S. PATENT DOCUMENTS

| | | | |
|---|---|---|---|
| 8,928,347 B2 | 1/2015 | Gotze et al. | |
| 9,948,471 B2 | 4/2018 | Katoh | |
| 2016/0041783 A1* | 2/2016 | Choi .................. | G06F 11/1048 711/103 |

(Continued)

FOREIGN PATENT DOCUMENTS

EP    2773061 B1    11/2015

OTHER PUBLICATIONS

Tebelmann et al., "EM Side-Channel Analysis of BCH-based Error Correction for PUF-based Key Generation", Nov. 2017, pp. 43-52 (Year: 2017).*

*Primary Examiner* — Thaddeus J Plecha
(74) *Attorney, Agent, or Firm* — Volentine, Whitt & Francos, PLLC

(57) ABSTRACT

A security device generates a key based on a physically unclonable function (PUF). The security device includes a physically unclonable function (PUF) block, an integrity detector, and a post processor. The PUF block outputs a plurality of first random signals and a plurality of corresponding first inverted random signals each having a logic level opposite to that of each of the plurality of corresponding first random signals. The integrity detector determines data integrity of the plurality of first random signals by using the plurality of first random signals and the plurality of corresponding first inverted random signals. The post processor generates a first row key that includes validity signals satisfying the data integrity.

19 Claims, 19 Drawing Sheets

(56) References Cited

U.S. PATENT DOCUMENTS

| | | | |
|---|---|---|---|
| 2016/0156476 A1* | 6/2016 | Lee | H04L 9/088 |
| | | | 380/44 |
| 2018/0183614 A1 | 6/2018 | Danger et al. | |
| 2018/0241557 A1* | 8/2018 | Maes | H03M 13/6356 |
| 2018/0270014 A1 | 9/2018 | Muratani | |
| 2018/0351753 A1 | 12/2018 | Gardner et al. | |
| 2019/0138753 A1* | 5/2019 | Wallrabenstein | H04L 9/0866 |
| 2019/0147967 A1 | 5/2019 | Tuyls et al. | |
| 2020/0153627 A1* | 5/2020 | Wentz | H04L 9/3218 |

* cited by examiner

SECURITY DEVICE GENERATING KEY BASED ON PHYSICALLY UNCLONABLE FUNCTION AND METHOD OF OPERATING THE SAME

CROSS-REFERENCE TO RELATED APPLICATION

This U.S. nonprovisional patent application claims the benefit of priority under 35 USC § 119 to Korean Patent Application No. 10-2020-0017145, filed on Feb. 12, 2020 in the Korean Intellectual Property Office, the disclosure of which is incorporated by reference herein in its entirety.

BACKGROUND

1. Technical Field

The inventive concept(s) described herein relate to a security device generating a key by using a physically unclonable function (PUF) and a method of operating the same.

2. Description of the Related Art

With the rapid development of wired and wireless communication technologies and smart device-related technologies, requirements for establishing a security system capable of safely using the technologies have also increased. One underlying method for providing security for a communication system and a smart device is mounting a security device implemented by hardware logic (as compared to logic implemented using a memory) in the communication system and the smart device. When a security chip with the hardware logic is first driven and then software such as an operating system (OS) is driven, authentication or an examination for malicious code is performed. Security technology based on a physically unclonable function (PUF) has recently evolved. A PUF may be a physical object with unique characteristics used to create a unique identity for use by the security device. When the PUF is used, it is possible to prevent duplication of an important key such as an authentication key stored in the security device.

SUMMARY

The inventive concept(s) described herein relate to a security device generating an efficient and correct key by using a validity map when the key is generated by using a physically unclonable function (PUF), and a method of operating the same.

According to an aspect of the present disclosure, a security device includes a physically unclonable function (PUF) block, an integrity detector, and a post processor. The PUF block includes a plurality of PUF cells that generate a plurality of first random signals and outputting the plurality of first random signals and a plurality of corresponding first inverted random signals each having a logic level opposite to that of each of the corresponding plurality of first random signals. The integrity detector determines data integrity of the plurality of first random signals by using the plurality of first random signals and the plurality of corresponding first inverted random signals. The post processor generates a first row key that includes validity signals satisfying the data integrity. The validity signals satisfying the data integrity are selected from the plurality of first random signals. The post processor also generates helper data including parity data corresponding to the first row key based on a predetermined error correction algorithm, and generates a key to which a PUF is applied by using the helper data.

According to an aspect of the present disclosure, a security device includes a physically unclonable function (PUF) block, a validity detector, an enrollment module and a memory block. The PUF block includes a plurality of PUF cells that generate a plurality of first random signals and outputting the plurality of first random signals. The validity detector generates a plurality of validity signals respectively corresponding to the plurality of PUF cells based on the plurality of first random signals in a first mode. The enrollment module generates a validity map for the PUF block based on the plurality of validity signals, and selects first valid random signals from the plurality of first random signals based on the validity map. The enrollment module also generates a first row key that includes the first valid random signals, and generates helper data including parity data corresponding to the first row key based on a predetermined error correction algorithm. The memory block stores the validity map and the helper data to be used when a key to which a PUF is applied is generated.

According to an aspect of the present disclosure, a security device includes a physically unclonable function (PUF) block, an enrollment block, an encoding module, and a memory block. The PUF block includes a plurality of PUF cells that generate a plurality of first random signals and outputting the plurality of first random signals. The enrollment block generates a first row key by using the plurality of first random signals in a first mode. The encoding module receives the first row key, obtains parity data by performing error correction on the first row key, and generates helper data including the parity data. The memory block stores the helper data.

According to an aspect of the present disclosure, a security device includes a physically unclonable function (PUF) block, a memory block, a key generator, and a decoding module. The PUF block includes a plurality of PUF cells that generate a plurality of first random signals and outputting the plurality of first random signals. The memory block stores a validity map including information on validity of the plurality of first random signals and helper data including parity data. The key generator receives the plurality of first random signals, receives the validity map from the memory block, and selects first valid random signals from the plurality of first random signals based on the validity map. The key generator also generates a first row key by using the first valid random signals. The decoding module receives the first row key, receives the helper data from the memory block, and generates a key by performing error correction on the first row key based on the helper data.

BRIEF DESCRIPTION OF THE DRAWINGS

Embodiments of the inventive concept(s) described herein will be more clearly understood from the following detailed description taken in conjunction with the accompanying drawings in which.

DETAILED DESCRIPTION OF THE EMBODIMENTS

Hereinafter, embodiments of the present disclosure will be described in detail with reference to the accompanying drawings.

Figure 1:
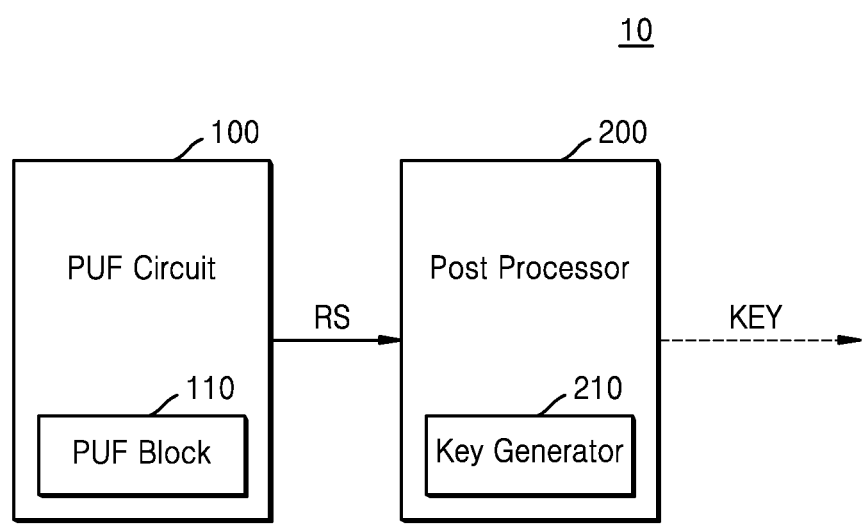
FIG. 1 is a block diagram illustrating a security device according to an exemplary embodiment of the present disclosure.

FIG. 1 is a block diagram illustrating a security device 10 according to an exemplary embodiment of the present disclosure.

Referring to FIG. 1, the security device 10 may generate a unique key KEY for security and may perform a security operation such as encryption/decryption by using the generated key KEY. The security device 10 may include a PUF circuit 100 (physically unclonable function (PUF) circuit) and a post processor 200.

The security device 10 may operate in one of an enrollment mode and a use mode. In the enrollment mode, the security device 10 may select valid random signals from a plurality of random signals RS generated by the PUF circuit 100 and may enroll a key generated by using the selected valid random signals. In the use mode, the security device 10 may generate a key by using a random signal generated by the PUF circuit 100 in response to a request of a host and may output the generated key to the host. In an embodiment, the enrollment mode may be performed once at a manufacturing point in time when the security device 10 is manufactured. The use mode may be performed at a plurality of points in time at which a key is to be generated by using the security device 10.

The PUF circuit 100 may include a PUF block 110. The PUF block 110 may generate the plurality of random signals RS. For this purpose, the PUF block 110 may include a plurality of PUF source circuits. Each of the plurality of PUF source circuits may generate a signal with a unique value in accordance with a PUF and may be referred to as a PUF cell in the current specification. A PUF may refer to a function of providing a unique value corresponding to hardware based on an intrinsic characteristic of the hardware. For example, although a plurality of hardware components such as semiconductor chips are manufactured by the same process, the plurality of hardware components may not physically and completely coincide with each other and minor variations may occur in the plurality of hardware components. Based on the variations, unique values of the plurality of hardware components may be extracted. The extracted values may be used for applications needing security. Examples of applications needing security for which the extracted values may be used include, for example, secure communication, secure data processing, user identification, and firmware update.

In some embodiments, each of the plurality of PUF source circuits included in the PUF block 110 may have an arbitrary structure in which a bit signal with a unique value is generated. As a non-limiting example, each of the plurality of PUF source circuits may have a static random access memory (SRAM)-type PUF structure based on a value stored in an SRAM cell, a ring oscillator structure based on a frequency variation, a leakage current based PUF structure, or an arbiter PUF structure in which a path of a signal is arbitrarily determined. In addition, each of the plurality of PUF source circuits may generate a bit signal with a unique value based on a difference among threshold levels of logic gates.

In an example, the PUF block 110 may include at least one of a PUF cell based on a transistor threshold voltage, a PUF cell based on an arbiter, a ring oscillator-based PUF cell, a memory-based PUF cell, and a reconfigurable PUF cell in accordance with a laser beam or a heat change. The PUF cell based on an arbiter may be, for example, a feed-forward PUF cell, an XOR PUF cell obtained by arranging arbiter PUF cells in parallel, or a lightweight PUF cell. The memory-based PUF cell may be, for example, an SRAM PUF cell, a latch PUF cell, a flash memory PUF cell, or a memistor PUF cell The PUF block 110 may generate the plurality of random signals RS based on signals generated by the plurality of PUF source circuits. Therefore, the plurality of random signals RS may be different from a random signal generated by a PUF block included in another security device with the same structure. In some embodiments, the PUF block 110 may generate an n-bit random signal RS (n is an integer greater than 1). For example, the PUF block 110 may include n PUF source circuits and each PUF source circuit may generate a 1-bit random signal RS.

The post processor 200 may include a key generator 230. The key generator 230 may generate a key KEY by receiving the plurality of random signals RS and performing post-treatment on the plurality of random signals RS. The key KEY as an encryption key uniquely generated by the security device 10 for security may be used as an encryption and decryption key or a key such as authentication code as the integrity of the key is guaranteed.

The key generator 230 may determine whether the plurality of random signals RS are valid and may generate a row key by using only the valid random signals. In addition, the post processor 200 may generate the key KEY by performing an error correction operation on the row key. That is, the key KEY may be generated based on the row key. The row key may be generated in an enrollment mode, for example, and the key KEY may be generated based on the row key in a use mode. The key KEY may be a key for use, such as a key provided to the outside for use in encryption or decryption. The key KEY is based on a PUF and is generated by using the helper data.

According to an embodiment of the present disclosure, the post processor 200 may generate a validity map including information on each of the valid random signals and may store the generated validity map in the enrollment mode in which the key KEY is enrolled. In addition, in an embodiment, the post processor 200 may store a parity bit generated by the error correction operation as helper data in the enrollment mode. The key generator 230 may generate the key KEY by using the stored validity map and/or helper data in a generation mode in which the key KEY is generated in response to a request of a user so that a key generating process may be efficiently performed.

In FIG. 1, the PUF circuit 100 and the post processor 200 are illustrated as being separate from each other, which is only an example. The PUF circuit 100 and the post processor 200 may be implemented by one configuration. In an example, the PUF circuit 100 may be implemented by hardware including the PUF block 110. The post processor 200 may be implemented by software and/or hardware.

Figure 2:
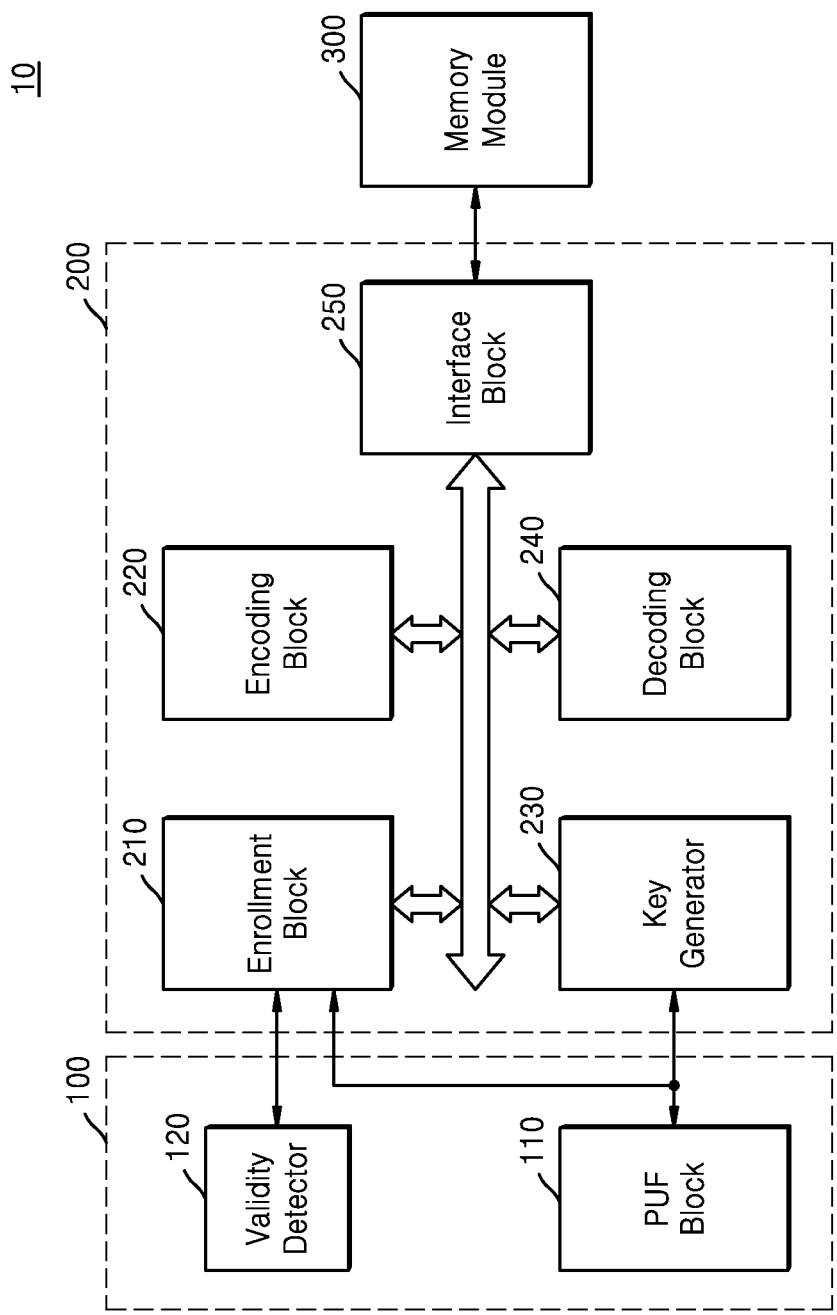
FIG. 2 is a block diagram illustrating a security device according to an exemplary embodiment of the present disclosure.

FIG. 2 is a block diagram illustrating the security device 10 according to an exemplary embodiment of the present disclosure.

Before proceeding, it should be clear that FIGS. herein including FIG. 2 show and reference circuitry with labels such as "blocks" or "modules". As is traditional in the field of the inventive concept(s) described herein, examples may be described and illustrated in terms of blocks and modules which carry out a described function or functions. These blocks and modules, which may be referred to herein as a PUF block, an enrollment block, an enrollment module, an encoding block, an encoding module, a decoding block, a decoding module, an interface block, an interface module, a memory module, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block or module may be implemented by dedicated hardware, or by a processor (e.g., one or more programmed microprocessors and associated circuitry), or by a combination of dedicated hardware to perform some functions of the block and a processor to perform other functions of the block. Each block or module of the examples may be physically separated into two or more interacting and discrete blocks without departing from the scope of the present disclosure. Likewise, the blocks and/or modules of the examples may be physically combined into more complex blocks without departing from the scope of the present disclosure.

Referring to FIG. 2, the security device 10 may include the PUF circuit 100, the post processor 200, and a memory module 300. The PUF circuit 100 may include the PUF block 110 and a validity detector 120. Because the PUF block 110 is described in detail in FIG. 1, descriptions thereof are omitted.

The validity detector 120 may generate a plurality of validity signals respectively corresponding to a plurality of random signals (and thus corresponding to the a plurality of PUF cells) by detecting validities of the plurality of random signals. The plurality of random signals may be used for generating a password that may be used as an authentication key. In this case, the password must have a time-invariant characteristic in which a value of the password does not change in accordance with a circumstance. The validity detector 120 may determine a time-invariant characteristic of a digital random signal and may generate the plurality of validity signals based on the determined time-invariant characteristic. The validity detector 120 may generate the plurality of validity signals based on validity of the plurality of validity signals, as determined based on and with respect to the time-invariant characteristic.

In an example, the validity detector 120 may generate a validity signal based on whether random signals output from PUF cells included in the PUF block 110 at different points in time are the same. In another example, the validity detector 120 may generate a validity signal based on whether random signals output from the PUF cells included in the PUF block 110 under different external conditions (for example, temperature, pressure, humidity, etc.) are the same.

The post processor 200 may include an enrollment block 210, an encoding block 220, a key generator 230, a decoding block 240, and an interface block 250. The enrollment block 210, the encoding block 220, the key generator 230, the decoding block 240, and the interface block 250 may be connected to communicate with each other. In an example, the enrollment block 210, the encoding block 220, the key generator 230, the decoding block 240, and the interface block 250 may be connected through a bus. In another example, at least parts of the enrollment block 210, the encoding block 220, the key generator 230, the decoding block 240, and the interface block 250 may be formed of software executed by one processor. Operations of the enrollment block 210, the encoding block 220, the key generator 230, the decoding block 240, and the interface block 250 transmitting data to each other may mean that operations in accordance with the respective components are continuously performed by one processor.

The enrollment block 210 may receive the plurality of random signals and the plurality of validity signals and may select the valid random signals based on the plurality of random signals and the plurality of validity signals in the enrollment mode. The enrollment block 210 may generate the row key by using the valid random signals and may output the generated row key to the encoding block 220.

According to an embodiment of the present disclosure, the enrollment block 210 may generate a validity map representing whether the plurality of random signals are valid based on the plurality of validity signals. The enrollment block 210 may store the generated validity map in the memory module 300 through the interface block 250.

The encoding block 220 may receive the row key from the enrollment block 210 and may perform the error correction operation on the row key by using an error correction code in the enrollment mode. The error correction code may include at least one of a low density parity check (LDPC) code, a Bose-Chaudhuri-Hocquenghem (BCH) code, a turbo code, a Reed-Solomon code, a convolution code, a recursive systematic code, and coded modulations such as a trellis-coded modulation (TCM), a block coded modulation (BCM), and majority voting.

According to an embodiment of the present disclosure, the encoding block 220 may generate helper data by using a parity code generated by performing the error correction operation on the row key. The encoding block 220 may store the generated helper data in the memory module 300 through the interface block 250.

The key generator 230 may receive the validity map from the memory module 300 through the interface block 250 and may receive the plurality of random signals from the PUF block 110. The key generator 230 may select the valid random signals from the plurality of random signals based on the validity map and may generate the row key by using the selected valid random signals.

The decoding block 240 may receive the helper data from the memory module 300 through the interface block 250 and may perform the error correction operation on the row key received from the key generator 230 by using the helper data. The decoding block 240 may output a key generated by performing the error correction operation to the outside (for example, a host). The key output by the decoding block 240 may be a key for use and is a key which is based on a PUF from the PUF block 110, and thus is a key to which a PUF is applied The memory module 300 may include system memory and non-volatile memory. In embodiments below, the system memory of the memory module 300 may be a system memory 310, and the non-volatile memory of the memory module 300 may be a non-volatile memory 320. The system memory may function as working memory required for operating the security device 10. In an embodiment, the interface block 250 may store the validity map and the helper data generated in the enrollment mode in the system memory. The interface block 250 may store the validity map and the helper data stored in the system memory in the non-volatile memory when the enrollment mode is completed.

In an example, the system memory may include high-speed volatile memory such as a latch, a register, static random access memory (SRAM), or dynamic random access memory (DRAM). The non-volatile memory in the system memory is memory in which data is not lost although power supply such as an electronic fuse is blocked and may include NAND flash memory, NOR flash memory, resistive random access memory (RRAM), ferroelectric random access memory (FRAM), phase change random access memory (PRAM), thyristor random access memory (TRAM), magnetic random access memory (MRAM), or one time programmable (OTP) memory.

Figure 3:
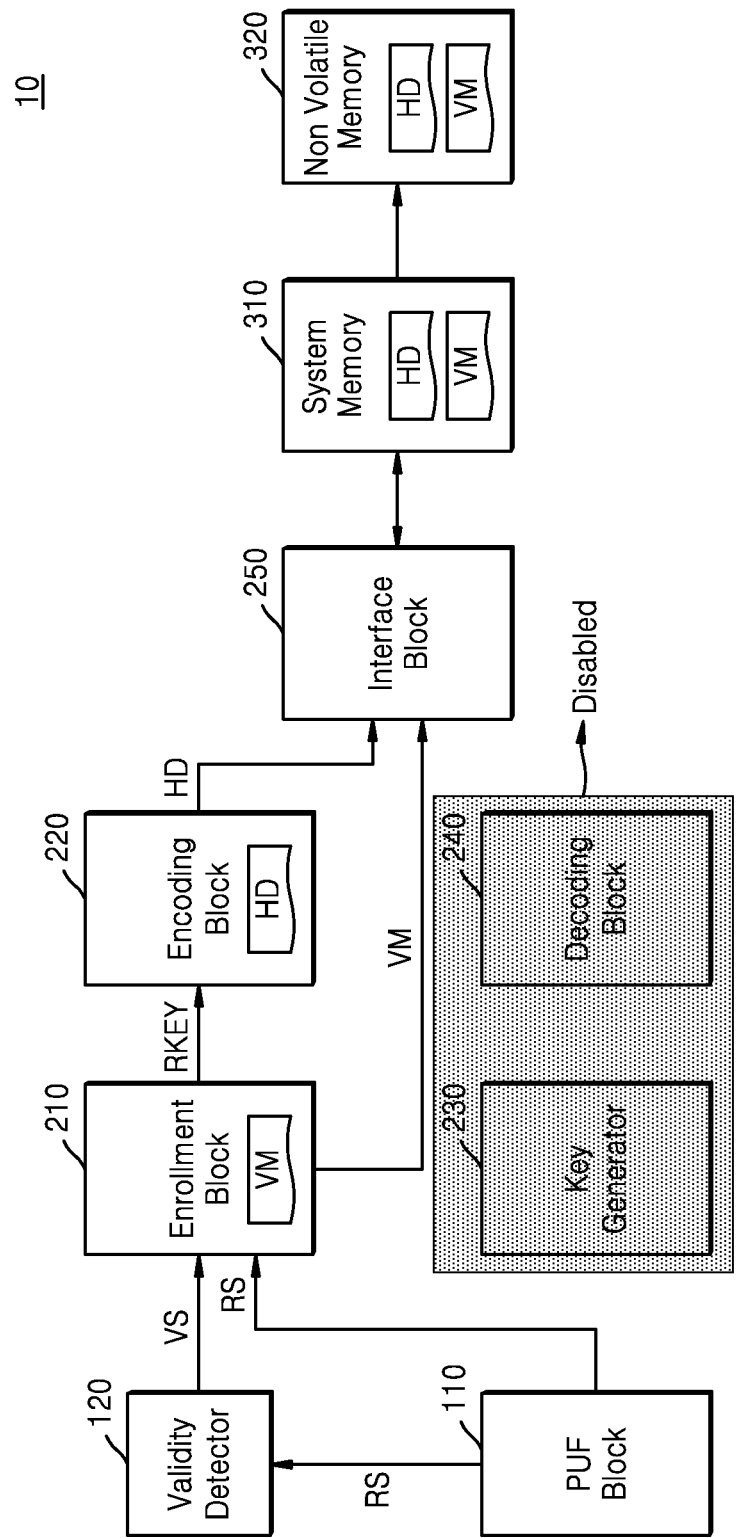
FIG. 3 is a block diagram illustrating a security device according to an exemplary embodiment of the present disclosure.

FIG. 3 is a block diagram illustrating the security device 10 according to an exemplary embodiment of the present disclosure. In detail, FIG. 3 illustrates an operation of the security device 10 in the enrollment mode. Descriptions previously given with reference to FIG. 1 are omitted.

Referring to FIG. 3, the security device 10 may include the PUF block 110, the validity detector 120, the enrollment block 210, the encoding block 220, the interface block 250, a system memory 310, and a non-volatile memory 320. In the enrollment mode, the key generator 230 and the decoding block 240 may be disabled.

Entering the enrollment mode, the PUF block 110 may output the plurality of random signals RS generated by the plurality of PUF cells included in the PUF block 110 to the validity detector 120 and the enrollment block 210. The validity detector 120 may generate the plurality of validity signals VS based on whether the plurality of random signals RS change in accordance with a time or a condition. In an embodiment, the plurality of validity signals VS may be respectively matched to the plurality of random signals RS one-by-one.

The enrollment block 210 may generate the validity map VM representing whether the plurality of random signals RS are valid based on the plurality of validity signals VS and may store the generated validity map VM in the system memory 310 through the interface block 250. In addition, the enrollment block 210 may select the valid random signals from the plurality of random signals RS based on the generated validity map VM and may generate the row key RKEY by using the selected random signals. The enrollment block 210 may output the generated row key RKEY to the encoding block 220.

The encoding block 220 may generate the parity code by performing the error correction operation on the received row key RKEY based on the previously determined error correction code. The encoding block 220 may store the generated parity code in the system memory 310 through the interface block 250 as the helper data HD.

The interface block 250 may store the validity map VM and the helper data HD in the system memory 310 in the enrollment mode. The interface block 250 may store the validity map VM and the helper data HD stored in the system memory 310 in the non-volatile memory 320 when the enrollment mode is completed.

Figure 4A:
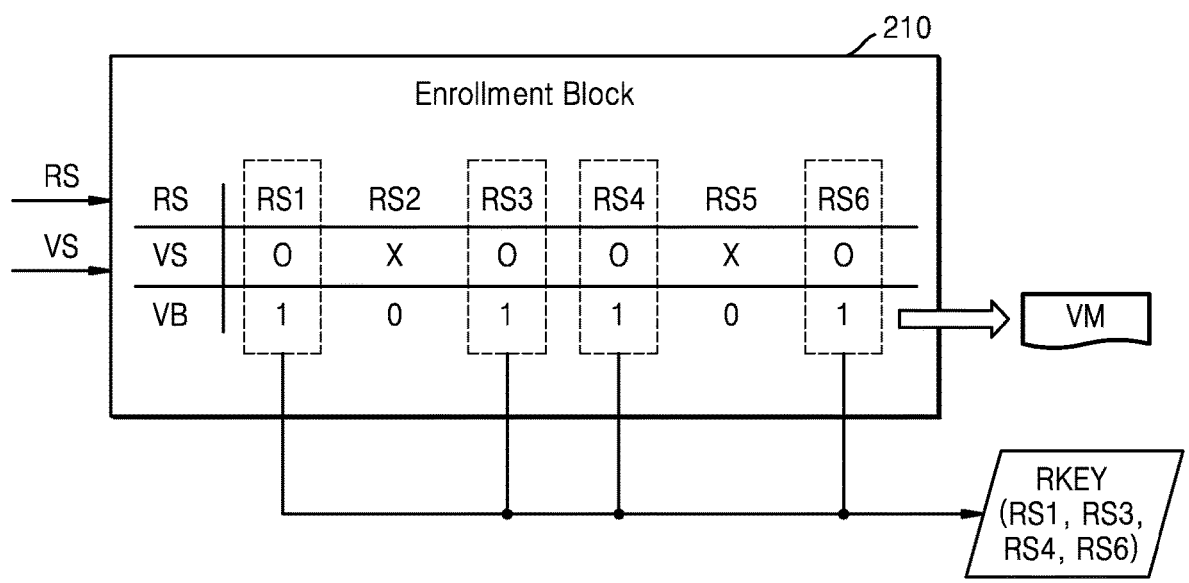
FIG. 4A is a view illustrating an operation of an enrollment block according to an exemplary embodiment of the present disclosure.

FIG. 4A is a view illustrating an operation of the enrollment block 210 according to an exemplary embodiment of the present disclosure. In detail, FIG. 4A illustrates a method of operating the enrollment block 210 in the enrollment mode. Descriptions previously given with reference to FIG. 3 are omitted.

Referring to FIG. 3 and FIG. 4A, the enrollment block 210 may receive the plurality of random signals RS including a first random signal RS1 to a sixth random signal RS6 and may receive the plurality of validity signals VS corresponding to the first random signal RS1 to the sixth random signal RS6. In an example, each of the plurality of random signals RS may have a first bit (for example, '1') or a second bit (for example, '0'). Each of the plurality of validity signals VS may have a first value (for example, 'O' or the bit '1' corresponding to 'O') representing that each of the plurality of validity signals VS is valid or a second value (for example, 'X' or the bit '0' corresponding to 'X') representing that each of the plurality of validity signals VS is not valid. 'O' and 'X" are only examples of the first value and the second value respectively, and the first value and the second value may be represented by other characters or values in other examples.

The enrollment block 210 may generate validity bits VB based on each of the plurality of validity signals VS and may generate the validity map VM by using the validity bits VB. In an embodiment, the enrollment block 210 may allot the first bit (for example, '1') as the validity bit VB when any of the plurality of validity signals VS has the first value representing that the validity signal VS is valid and may allot the second bit (for example, '0') as the validity bit VB when any of the plurality of validity signals VS has the second value representing that the validity signal VS is not valid. In another embodiment, the enrollment block 210 may allot the plurality of validity signals VS as the validity bits VB. The enrollment block 210 may generate the validity map VM by using the validity bits VB and may output the generated validity map VM to the interface block 250. In the example of FIG. 4A, the validity map VM may include '101101'. In an embodiment, the validity map VM may include validity bits for all the random signals that may be generated by the PUF block 110.

The enrollment block 210 may select the valid random signals from the plurality of random signals RS by using the generated validity bits VB. In the example of FIG. 4A, because the validity bits VB corresponding to each of the first random signal RS1, the third random signal RS3, the fourth random signal RS4, and the sixth random signal RS6 are the first bit '1', the enrollment block 210 may select the first random signal RS1, the third random signal RS3, the fourth random signal RS4, and the sixth random signal RS6 from the plurality of random signals RS and may output the row key RKEY by using the first random signal RS1, the third random signal RS3, the fourth random signal RS4, and the sixth random signal RS6.

Figure 4B:
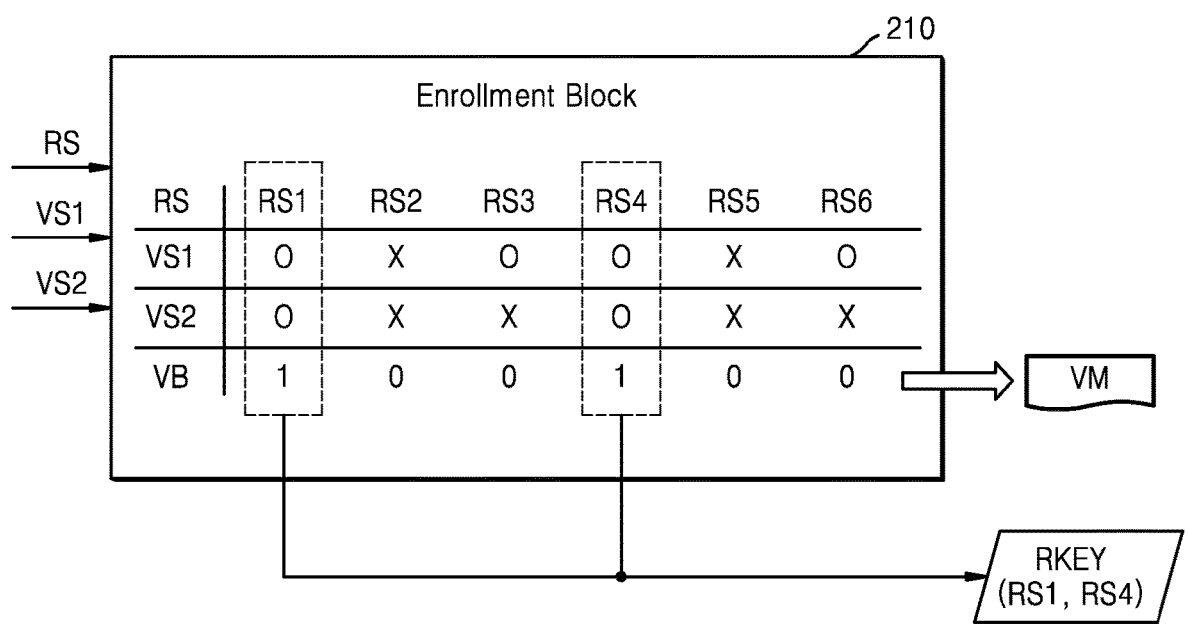
FIG. 4B is a view illustrating an operation of an enrollment block according to an exemplary embodiment of the present disclosure.

FIG. 4B is a view illustrating an operation of the enrollment block 210 according to an exemplary embodiment of the present disclosure. In detail, FIG. 4B illustrates a method of operating the enrollment block 210 in the enrollment mode. Descriptions previously given with reference to FIG. 3 and FIG. 4A are omitted.

Referring to FIG. 3 and FIG. 4B, unlike in FIG. 4A, the enrollment block 210 may receive a plurality of first validity signals VS1 and a plurality of second validity signals VS2. In an example, the plurality of first validity signals VS1 may be obtained as a result of detecting validity under a first condition or at a first point in time and the plurality of second validity signals VS2 may be obtained as a result of detecting validity under a second condition or at a second point in time.

The enrollment block 210 may generate the validity bits VB based on the plurality of first validity signals VS1 and the plurality of second validity signals VS2 and may generate the validity map VM by using the validity bits VB. In an embodiment, the enrollment block 210 may allot the first bit (for example, '1') as the validity bit VB when each of the first validity signal VS1 and the second validity signal VS2 corresponding to any of the random signals has the first value representing that each of the first validity signal VS1 and the second validity signal VS2 is valid, and may allot the second bit (for example, '0') as the validity bit VB when either of the first validity signal VS1 or the second validity signals VS2 has the second value representing that the first validity signal VS1 or the second validity signal VS2 is not valid. In an embodiment, the enrollment block 210 may generate a resultant value obtained by performing an AND operation on the first validity signal VS1 and the second validity signal VS2 as the validity bit VB. The enrollment block 210 may generate the validity map VM by using the validity bits VB and may output the generated validity map VM to the interface block 250. In the example of FIG. 4B, the validity map VM may include '100100'. As shown, for any of the random signals, when both the first validity signal VS1 and the second validity signal VS2 has the first value representing that the first validity signal VS1 and the second validity signal VS2 are valid, the first bit (for example, '1') is allotted as the validity bit VB. Otherwise, the second bit (for example, '0') is allotted as the validity bit VB.

The enrollment block 210 may select the valid random signals from the plurality of random signals RS by using the generated validity bit VB. In the example of FIG. 4B, because the validity bit VB corresponding to each of the first random signal RS1 and the fourth random signal RS4 is the first bit '1', the enrollment block 210 may select the first random signal RS1 and the fourth random signal RS4 from the plurality of random signals RS. The enrollment block 210 may output the row key RKEY by using the first random signal RS1 and the fourth random signal RS4.

Figure 5A:
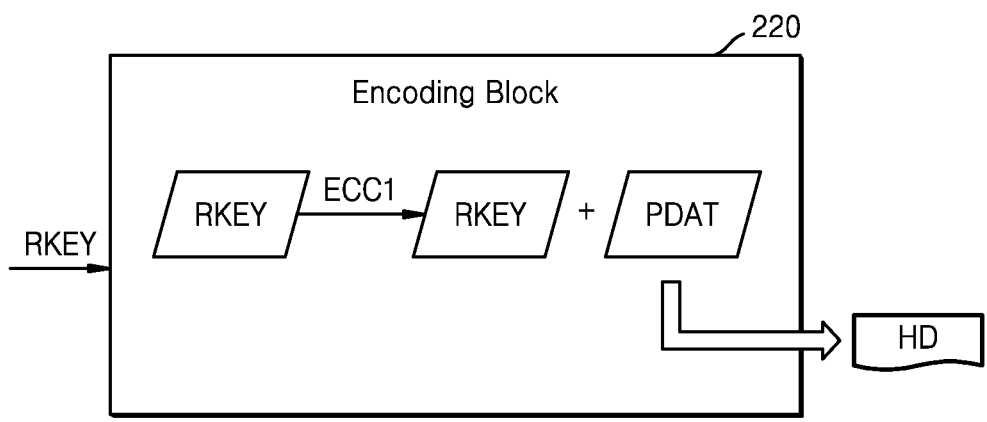
FIG. 5A is a view illustrating an operation of an encoding block according to an exemplary embodiment of the present disclosure.

FIG. 5A is a view illustrating an operation of the encoding block 220 according to an exemplary embodiment of the present disclosure. In detail, FIG. 5A illustrates a method of operating the encoding block 220 in the enrollment mode. Descriptions previously given with reference to FIG. 3 are omitted.

Referring to FIG. 3 and FIG. 5A, the encoding block 220 may generate parity data PDAT by receiving the row key RKEY and applying the row key RKEY to the error correction code ECC. The generation of the parity data PDAT is indicated by the plus (+) symbol in FIG. 5A. As described above, the error correction code ECC may include at least one of the LDPC code, the BCH code, the turbo code, the Reed-Solomon code, the convolution code, the RSC, the TCM, the BCM, and the majority voting.

The encoding block 220 may generate the parity data PDAT as the helper data HD and may store the helper data HD in the memory module 300. In an embodiment, when the security device 10 generates a plurality of keys, the helper data HD may include the parity data PDAT for each of the plurality of keys. The helper data HD including the parity data PDAT is indicated by the arrow symbol pointing down and to the right in FIG. 5B.

Figure 5B:
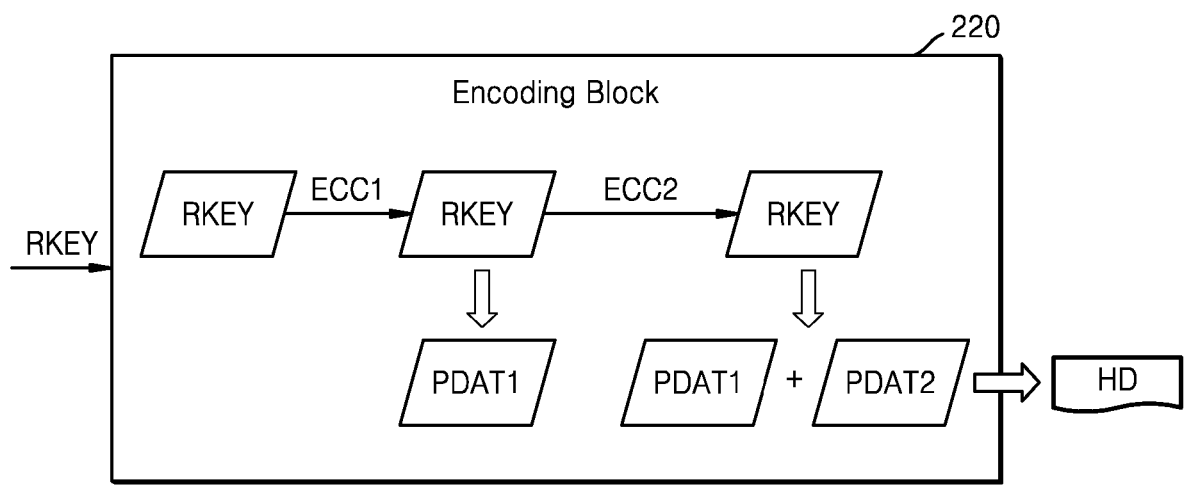
FIG. 5B is a view illustrating an operation of an encoding block according to an exemplary embodiment of the present disclosure.

FIG. 5B is a view illustrating an operation of the encoding block 220 according to an exemplary embodiment of the present disclosure. In detail, FIG. 5B illustrates a method of operating the encoding block 220 in the enrollment mode. Descriptions previously given with reference to FIG. 3 and FIG. 5A are omitted.

Referring to FIG. 3 and FIG. 5B, the encoding block 220 may generate first parity data PDAT1 by receiving the row key RKEY and applying the row key RKEY to a first error correction code ECC1. The generation of the first parity data PDAT1 is indicated by the first arrow symbol pointing down in FIG. 5B. The encoding block 220 may generate second parity data PDAT2 by applying the row key RKEY to the first error correction code ECC1 and then, applying the row key RKEY to a second error correction code ECC2. The generation of the second parity data PDAT2 is indicated by the second arrow symbol pointing down in FIG. 5B. In an embodiment, the first error correction code ECC1 may be the majority voting and the second error correction code ECC2 may be the BCH code.

The encoding block 220 may generate the first parity data PDAT1 and the second parity data PDAT2 as the helper data HD and may store the helper data HD in the memory module 300. The helper data HD including the first parity data PDAT1 and the second parity data PDAT2 is indicated by both the plus (+) symbol and the arrow symbol pointing to the right in FIG. 5B.

Figure 6:
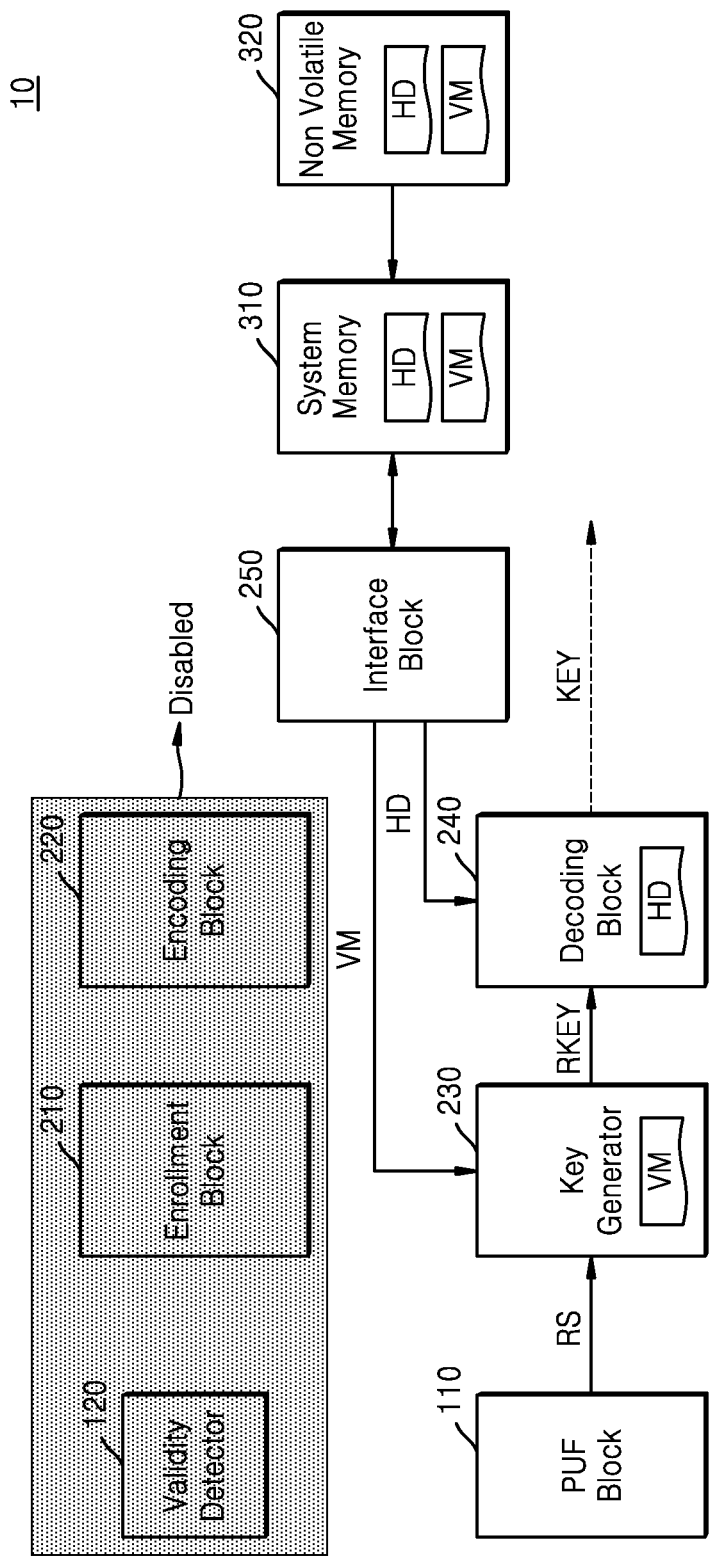
FIG. 6 is a block diagram illustrating a security device according to an exemplary embodiment of the present disclosure.

FIG. 6 is a block diagram illustrating the security device 10 according to an exemplary embodiment of the present disclosure. In detail, FIG. 6 illustrates an operation of the security device 10 in accordance with a use mode. Descriptions previously given with reference to FIG. 2 are omitted.

Referring to FIG. 6, the security device 10 may include the PUF block 110, the key generator 230, the decoding block 240, the interface block 250, the system memory 310, and the non-volatile memory 320. In the use mode, the validity detector 120, the enrollment block 210, and the encoding block 220 may be disabled.

Entering the use mode, the PUF block 110 may output the plurality of random signals RS generated by the plurality of PUF cells included in the PUF block 110 to the key generator 230.

The key generator 230 may read the validity map VM from the non-volatile memory 320 through the interface block 250 and may select the valid random signals from the plurality of random signals RS based on the read validity map VM. In an embodiment, the key generator 230 may select the valid random signals by using the validity map VM loaded on the system memory 310 from the non-volatile memory 320. The key generator 230 may generate the row key RKEY by using the selected valid random signals. In an embodiment, the key generator 230 may generate the row key RKEY by concatenating the selected valid random signals.

According to an embodiment of the present disclosure, the key generator 230 may select the valid random signals by using the validity map VM without an additional validity signal. Since the validity detector 120 is disabled in the use mode, power efficiency may increase and resources required for generating a key may be reduced.

The decoding block 240 may read the helper data HD from the memory module 300 through the interface block 250 and may perform error correction on the row key RKEY by using the read helper data HD. In an embodiment, the decoding block 240 may perform error correction by using the helper data HD loaded on the system memory 310 from the non-volatile memory 320. The decoding block 240 may obtain one or more parity data pieces from the helper data HD and may perform error correction on the row key RKEY by using the obtained parity data pieces. The decoding block 240 may output the key KEY generated as a result of performing error correction to the outside (for example, the host). In an embodiment, the decoding block 240 may output the key KEY through the interface block 250. The interface block 250 may interface with the outside, or may control interfaces that interface with the outside. In an embodiment, the decoding block 240 may output the row key RKEY on which error correction is performed as the key KEY.

According to an embodiment of the present disclosure, the decoding block 240 may efficiently perform error correction with increased accuracy by performing error correction on the row key RKEY by using the previously generated helper data HD.

The interface block 250 may load the validity map VM and the helper data HD on the system memory 310 from the non-volatile memory 320 included in the memory module 300 in the use mode. The key generator 230 and the decoding block 240 may perform the above-described operation by using the validity map VM and the helper data HD loaded on the system memory 310.

Figure 7:
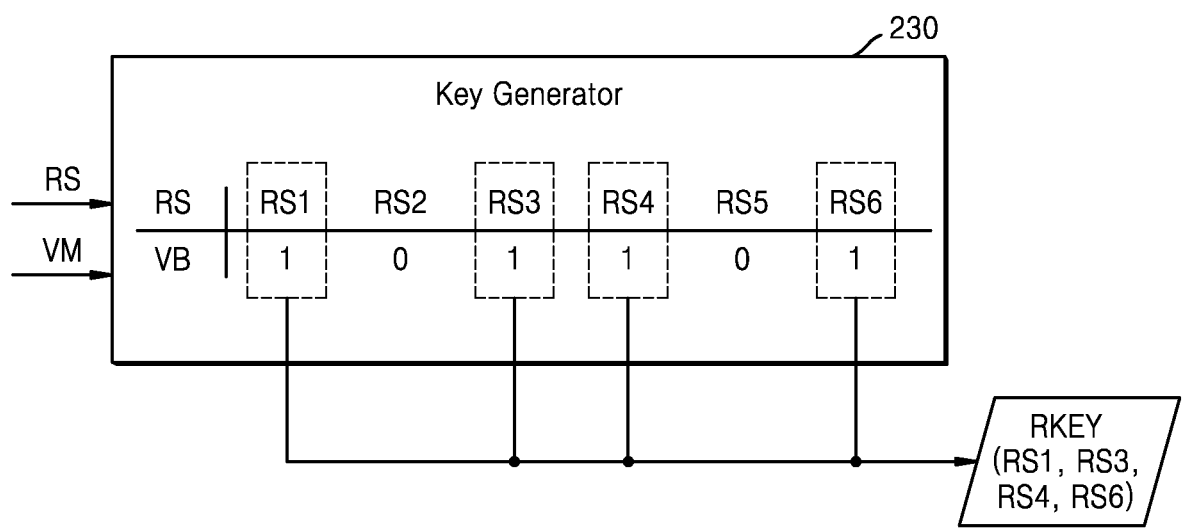
FIG. 7 is a view illustrating an operation of a key generator according to an exemplary embodiment of the present disclosure.

FIG. 7 is a view illustrating an operation of the key generator 230 according to an exemplary embodiment of the present disclosure. In detail, FIG. 7 illustrates a method of operating the key generator 230 in the use mode. Descriptions previously given with reference to FIG. 6 are omitted.

Referring to FIG. 6 and FIG. 7, the key generator 230 may receive the validity map VM and the plurality of random signals RS including the first random signal RS1 to the sixth random signal RS6. The validity map VM may include a plurality of validity bits respectively corresponding to the plurality of random signals RS.

The key generator 230 may determine a random signal corresponding to the first bit (for example, '1') representing validity as the validity bit VB as a valid random signal and may determine a random signal corresponding to the second bit (for example, '0') representing invalidity as the validity bit VB as an invalid random signal. In the example of FIG. 7, the key generator 230 may determine each of the first random signal RS1, the third random signal RS3, the fourth random signal RS4, and the sixth random signal RS6 having the validity bit VB '1' to be valid and may generate the row key RKEY by concatenating the first random signal RS1, the third random signal RS3, the fourth random signal RS4, and the sixth random signal RS6.

Figure 8:
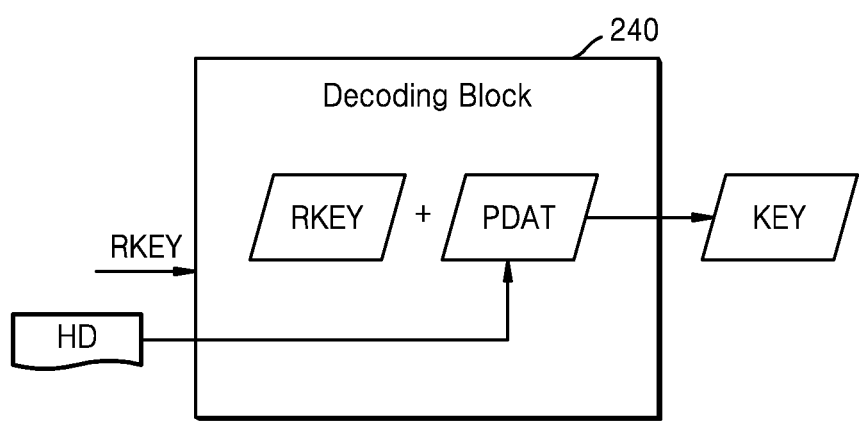
FIG. 8 is a view illustrating an operation of a decoding block according to an exemplary embodiment of the present disclosure.

FIG. 8 is a view illustrating an operation of the decoding block 240 according to an exemplary embodiment of the present disclosure. In detail, FIG. 8 illustrates a method of operating the decoding block 240 in the use mode. Descriptions previously given with reference to FIG. 6 are omitted.

Referring to FIG. 6 and FIG. 8, the decoding block 240 may receive the row key RKEY and the helper data HD and may generate the parity data PDAT from the helper data HD. The decoding block 240 may perform error correction on the row key RKEY by using the parity data PDAT.

In an embodiment, the decoding block 240 may obtain a plurality of parity data pieces PDAT from the helper data HD. The decoding block 240 may perform error correction in accordance with a first error correction algorithm on the row key RKEY by using first parity data among the plurality of parity data pieces PDAT and then, may perform error correction in accordance with a second error correction algorithm on the row key RKEY by using second parity data among the plurality of parity data pieces PDAT.

In an embodiment, the decoding block 240 may obtain a resultant value in accordance with the majority voting as the first parity data from the helper data HD and may perform error correction on the row key RKEY by using the majority voting. After error correction is performed by using the majority voting, the decoding block 240 may obtain a resultant value in accordance with the BCH code as the second parity data from the helper data HD and may finally generate the key KEY by performing error correction on the row key RKEY by using the BCH code.

Figure 9:
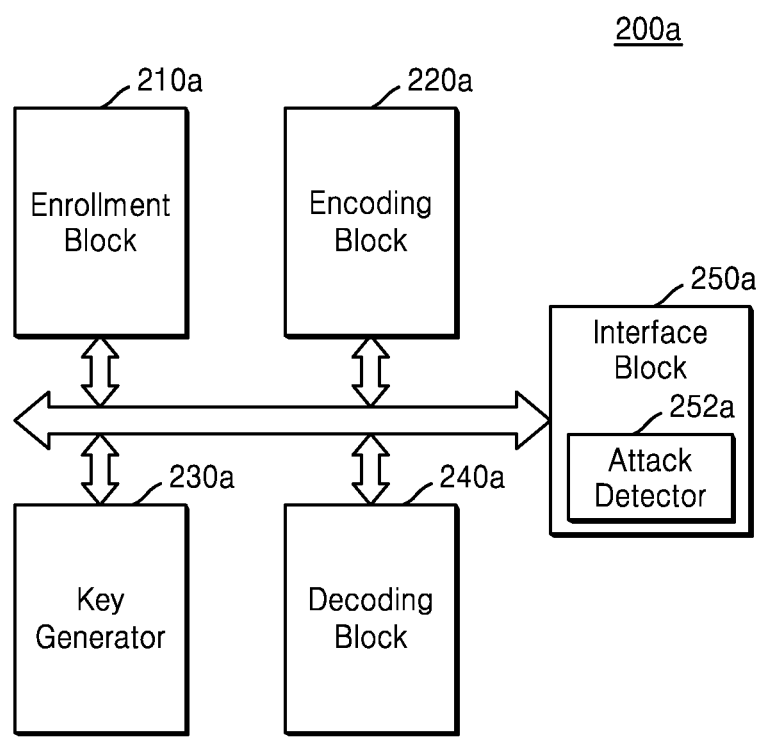
FIG. 9 is a block diagram illustrating a post processor according to an exemplary embodiment of the present disclosure.

FIG. 9 is a block diagram illustrating a post processor 200a according to an exemplary embodiment of the present disclosure. Descriptions previously given with reference to FIG. 2 are omitted.

Referring to FIG. 9, the post processor 200a may include an enrollment block 210a, an encoding block 220a, a key generator 230a, a decoding block 240a, and an interface block 250a. The interface block 250a may include an attack detector 252a. Because the enrollment block 210a, the encoding block 220a, the key generator 230a, and the decoding block 240a may perform operations that are the same as or similar to those of the enrollment block 210, the encoding block 220, the key generator 230, and the decoding block 240 described in detail with reference to FIG. 2, descriptions thereof are omitted.

The attack detector 252a may include a register receiving a key generated in the use mode or the enrollment mode and storing the key before outputting the key to the outside. The attack detector 252a may determine whether the register storing the key is attacked from the outside. In an embodiment, the attack detector 252a may generate an inverted key by inverting one or more bits of the key and may determine whether the register is attacked from the outside by comparing the inverted key with the key obtained by the register.

According to an embodiment of the present disclosure, the attack detector 252a may guarantee the integrity of the key by determining whether the register storing the key is attacked by using the inverted key.

In FIG. 9, the attack detector 252a is illustrated as being included in the interface block 250a, which is only an example. The embodiment of the present disclosure may also be applied to a case in which the attack detector 252a is included in a configuration from which a key is output.

Figure 10A:
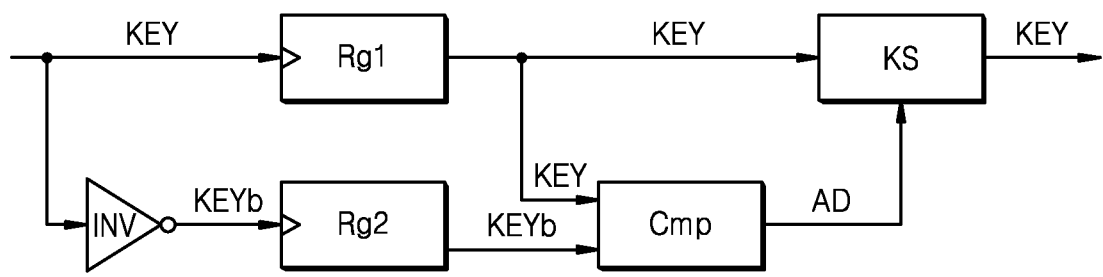
FIG. 10A and FIG. 10B are circuit diagrams illustrating an attack detector according to an exemplary embodiment of the present disclosure.
Figure 10B:
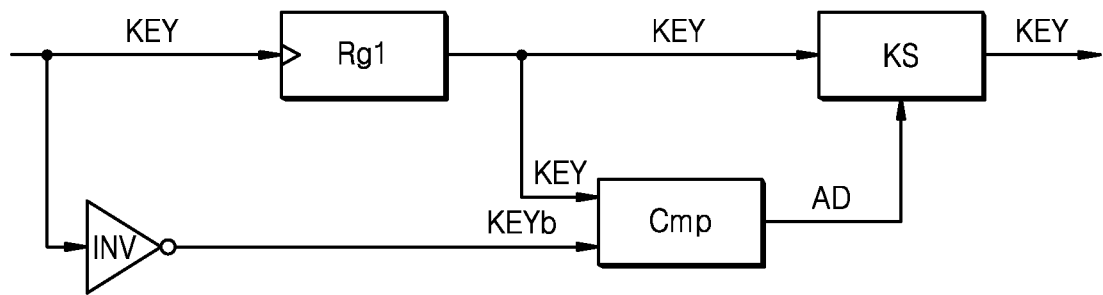

FIG. 10A and FIG. 10B are circuit diagrams illustrating attack detectors according to an exemplary embodiment of the present disclosure. Descriptions previously given with reference to FIG. 9 are omitted.

Referring to FIG. 10A, the attack detector 252a may include a first register Rg1, a second register Rg2, an inverter INV, a comparator Cmp, and a key switch KS. The first register Rg1 may receive and store the key KEY. The inverter INV may receive the key KEY and may generate an inverted key KEYb by inverting the bit(s) of the key KEY. In an example, the inverter INV may generate the inverted key KEYb by converting '1' into '0' and '0' into '1' in data included in the key KEY.

The inverter INV may store the inverted key KEYb in the second register Rg2 and the comparator Cmp may generate an attack detection signal AD by receiving the key KEY from the first register Rg1, receiving the inverted key KEYb from the second register Rg2, and comparing the key KEY with the inverted key KEYb. In an example, the comparator Cmp may compare the key KEY with the inverted key KEYb bit-by-bit, may output '0' as the attack detection signal AD when all the bits of the key KEY are different from all the bits of the inverted key KEYb, and may output '1' as the attack detection signal AD when any of the bits of the key KEY are the same as the corresponding bits of the inverted key KEYb.

The key switch KS may receive the key KEY and may output the key KEY based on the attack detection signal AD. In an example, based on the attack detection signal AD, the key switch KS may output the key KEY when all the bits of the key KEY are different from all the bits of the inverted key KEYb and may not output the key KEY when any of the bits of the key KEY are the same as the corresponding bits of the inverted key KEYb. In an example, the key switch KS may inform the key generator 230a (FIG. 9) that an attack is detected and the key generator 230a may generate a new key KEY in response to the information.

The first register Rg1 may be exposed to the outside as a physical device. Therefore, an attacker may confirm the key KEY stored in the first register Rg1 through decapsulation. According to an embodiment of the present disclosure, the attack of the attacker may be detected based on whether the key KEY included in the first register Rg1 is transformed. As a result, when the key KEY is transformed, the integrity of the key KEY may be guaranteed by generating a new key KEY without using the transformed key KEY.

Referring to FIG. 10B, an attack detector 253a may include the first register Rg1, the inverter INV, the comparator Cmp, and the key switch KS. When the inverted key KEYb is received from the inverter INV, the comparator Cmp may generate the attack detection signal AD by receiving the key KEY stored in the first register Rg1 and comparing the key KEY with the inverted key KEYb. Because the operation of FIG. 10B may be the same as or similar to the operation of FIG. 10A excluding the above description, previously given descriptions are omitted.

Figure 11:
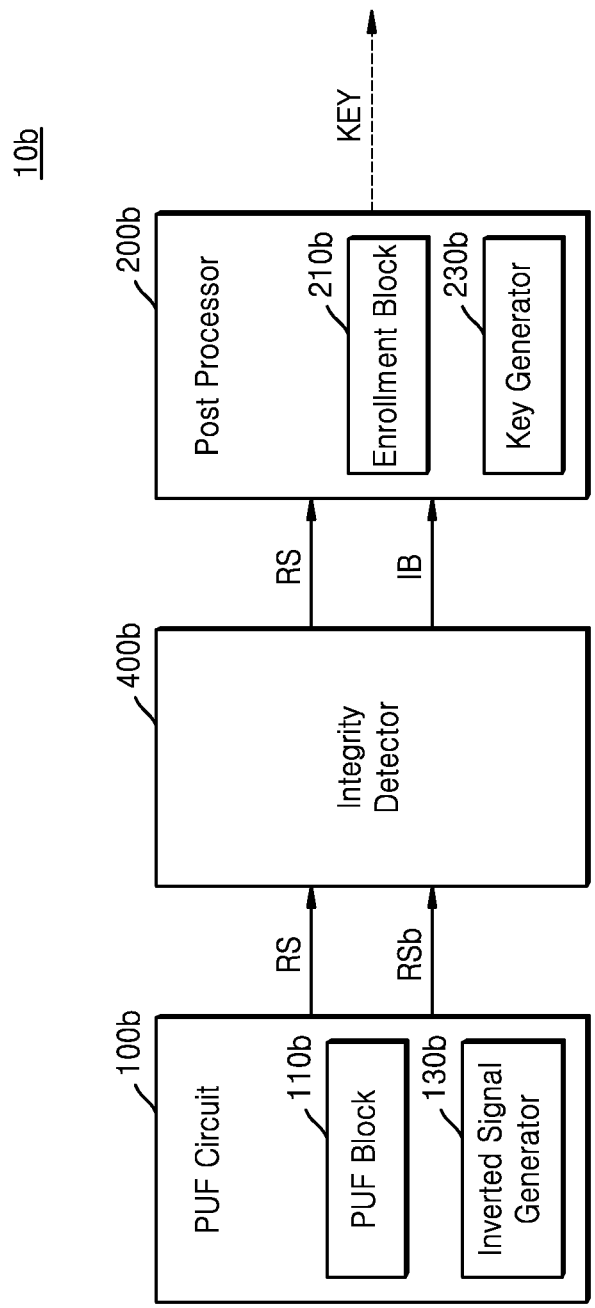
FIG. 11 is a block diagram illustrating a security device according to an exemplary embodiment of the present disclosure.

FIG. 11 is a block diagram illustrating a security device 10b according to an exemplary embodiment of the present disclosure. Descriptions previously given with reference to FIG. 2 are omitted.

Referring to FIG. 11, the security device 10b may include a PUF circuit 100b, an integrity detector 400b, and a post processor 200b. The PUF circuit 100b may include a PUF block 110b and an inverted signal generator 130b. Because the PUF block 110b may be the same as or similar to the PUF block 110 described in detail with reference to FIG. 2, descriptions thereof are omitted.

The PUF block 110b may generate a random signal RS and may output the generated random signal RS to the integrity detector 400b. The inverted signal generator 130b may generate an inverted random signal RSb by inverting the random signal RS generated by the PUF block 110b. The inverted signal generator 130b may output the generated inverted random signal RSb to the integrity detector 400b. For this purpose, in an embodiment, the inverted signal generator 130b may include at least one inverter.

The integrity detector 400b may detect integrity of the random signal RS by receiving the random signal RS and the inverted random signal RSb and comparing the random signal RS with the inverted random signal RSb. The integrity detector 400b may output a result of detecting the integrity of the random signal RS to the post processor 200b as an integrity bit IB. In an embodiment, the integrity detector 400b may include at least one comparator comparing the random signal RS with the inverted random signal RSb and the comparator may compare bits of the random signal RS with bits of the inverted random signal RSb.

When it is determined that all the bits of the random signal RS are different from all the bits of the inverted random signal RSb, the integrity detector 400b may output the first value (for example, '1') representing integrity as the integrity bit IB. When it is determined that any of the bits of the random signal RS are the same as the corresponding bits of the inverted random signal RSb, the integrity detector 400b may output the second value (for example, '0') representing non-integrity as the integrity bit IB.

In an embodiment, after the random signal RS is generated by the PUF circuit 100b, the random signal RS may be transformed by an external attacker. In this case, at least one bit of the inverted random signal RSb generated by the PUF circuit 100b may not be different from at least one corresponding bit of the random signal RS. That is, based on the integrity bit, the post processor 200b may determine whether the random signal RS has integrity.

The post processor 200b may include an enrollment block 210b and a key generator 230b. In the enrollment mode, when the first value which indicates integrity is received as the integrity bit, the enrollment block 210b may generate a row key based on the random signal RS and may generate information on a valid random signal as a validity map like in the above-described method. When the second value indicating non-integrity is received as the integrity bit IB, the enrollment block 210b may discard the random signal RS and may request the PUF circuit 100b to provide a new random signal. In another embodiment, the enrollment block 210b may discard the random signal corresponding to the second value as the integrity bit IB and may perform an enrollment process by using only the random signal corresponding to the first value as the integrity bit IB. That is, bits of the random signal indicating non-integrity may be discarded, and bits of the random signal indicating integrity may be enrolled as the random signal. The key KEY may then be generated using the random signal enrolled with only the bits indicating integrity.

When the first value representing integrity is received as the integrity bit IB in the use mode, the key generator 230b may generate the row key based on the random signal RS and the post processor 200b may output the key KEY generated by using the row key to the outside. When the second value representing non-integrity is received as the integrity bit IB, the key generator 230b may discard the random signal RS and may request the PUF circuit 100b to provide a new random signal. In addition, in another embodiment, the key generator 230b may discard the random signal corresponding to the second value as the integrity bit IB and may generate the key KEY by using only the random signal corresponding to the first value as the integrity bit IB. According to the embodiment of at least FIG. 11, the key generator 230b may determine whether to generate a second row key from a plurality of first random signals including the random signal RS based on the determination of the integrity detector 400b on data integrity of the random signal RS. That is, a first row key KEY may not be generated, or may be discarded, and a second row key KEY may be generated by using a new random signal or by using only the random signal corresponding to the first value as the integrity bit IB.

According to an embodiment of the present disclosure, the integrity detector 400b may determine whether the random signal RS is attacked by using the random signal RS and the inverted random signal RSb and may help ensure the integrity of the random signal RS.

Figure 12:
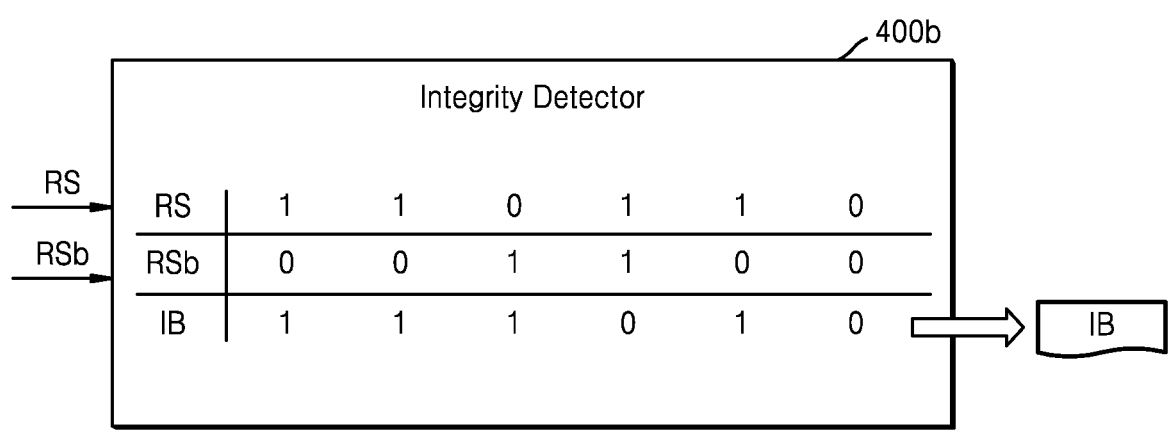
FIG. 12 is a view illustrating an operation of an integrity detector according to an exemplary embodiment of the present disclosure.

FIG. 12 is a view illustrating an operation of the integrity detector 400b according to an exemplary embodiment of the present disclosure. Descriptions previously given with reference to FIG. 11 are omitted.

Referring to FIG. 11 and FIG. 12, the integrity detector 400b may generate the integrity bit IB by receiving the random signal RS and the inverted random signal RSb and comparing the random signal RS with the inverted random signal RSb. In the example of FIG. 12, the integrity detector 400b may receive '110110' as the random signal RS and may receive '001100' as the inverted random signal RSb.

The integrity detector 400b may allot the first value (for example, '1') as the integrity bit IB when some bits of the random signal RS are different from some bits of the inverted random signal RSb and may allot the second value (for example, '0') as the integrity bit IB when some bits of the random signal RS are not different from some bits of the inverted random signal RSb. For example, for any bit of the random signal RS that is different from the corresponding bit of the inverted random signal RSb, the integrity detector 400b may allot the first value (for example, '1') as the integrity bit IB. For any bit of the random signal RS that is not different from the corresponding bit of the inverted random signal RSb, the integrity detector 400b may allot the second value (for example, '0') as the integrity bit IB.

In the example of FIG. 12, the integrity detector 400b may compare the bits '110110' of the random signal RS with the bits '001100' of the inverted random signal RSb bit-by-bit. The integrity detector 400b may allot '1' as the integrity bit IB because the first, second, third, and fifth bits of the random signal RS are different from the first, second, third, and fifth bits of the inverted random signal RSb and may allot '0' as the integrity bit IB because the fourth and sixth bits of the random signal RS are not different from the fourth and sixth bits of the inverted random signal RSb. As a result, the integrity detector 400b may output '111010' as the integrity bits IB.

Because the post processor 200b receives '111010' as the integrity bits IB, which means at least one random signal RS with non-integrity exists, the random signal RS may be discarded and a new random signal may be requested from the PUF circuit 100b. In addition, in another embodiment, because the post processor 200b receives '111010' as the integrity bits IB, fourth and sixth bits of the random signal RS with non-integrity are discarded and the enrollment process may be performed or a key may be generated by using only first, second, third, and fifth bits of the random signal RS.

Figure 13:
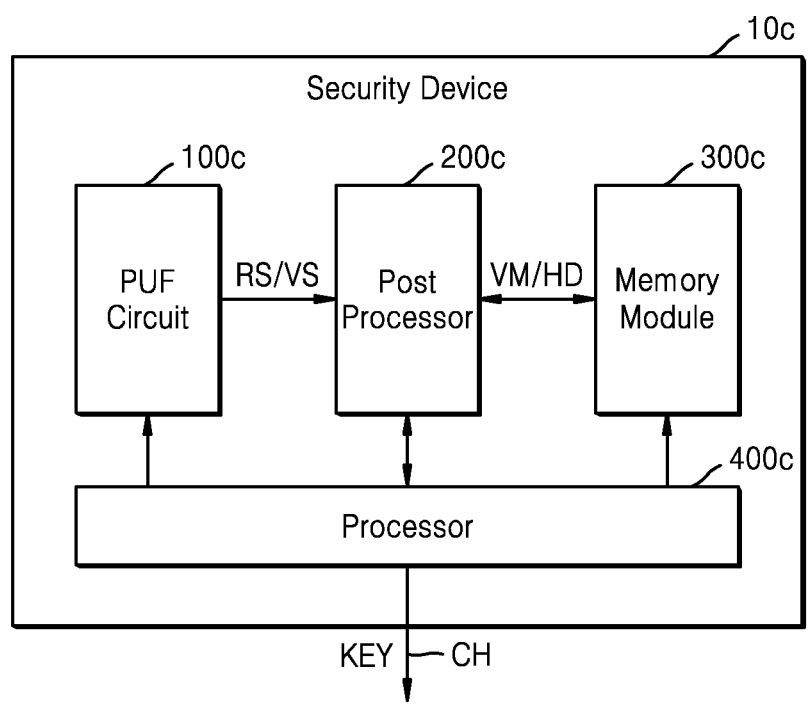
FIG. 13 is a block diagram illustrating an integrated circuit according to an exemplary embodiment of the present disclosure.

FIG. 13 is a block diagram illustrating a security device 10c according to an exemplary embodiment of the present disclosure. Descriptions previously given with reference to FIG. 1 to FIG. 12 are omitted.

Referring to FIG. 13, the security device 10c may include a function block performing another function as well as a trial-authentication method PUF. For example, the security device 10c may further include a processor 400c as well as a PUF circuit 100c, a post processor 200c, and a memory module 300c as a system-on-chip (SoC). The processor 400c may include an arbitrary processing unit performing a set of instructions and may include a field programmable gate array (FPGA) and a hardware accelerator. In an embodiment, the processor 400c may output various control signals controlling the PUF circuit 100c, the post processor 200c, and the memory module 300c to the PUF circuit 100c, the post processor 200c, and the memory module 300c.

The processor 400c may communicate with another device through a communication channel CH and may transmit a key KEY. The communication channel CH may include a cable channel and/or a radio channel.

Figure 14A:
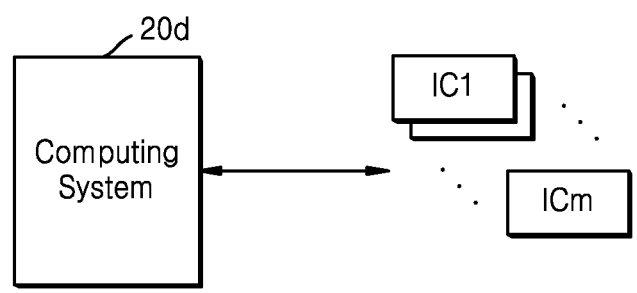
FIG. 14A and FIG. 14B are block diagrams illustrating an environment in which a security device according to an exemplary embodiment of the present disclosure is used.
Figure 14B:
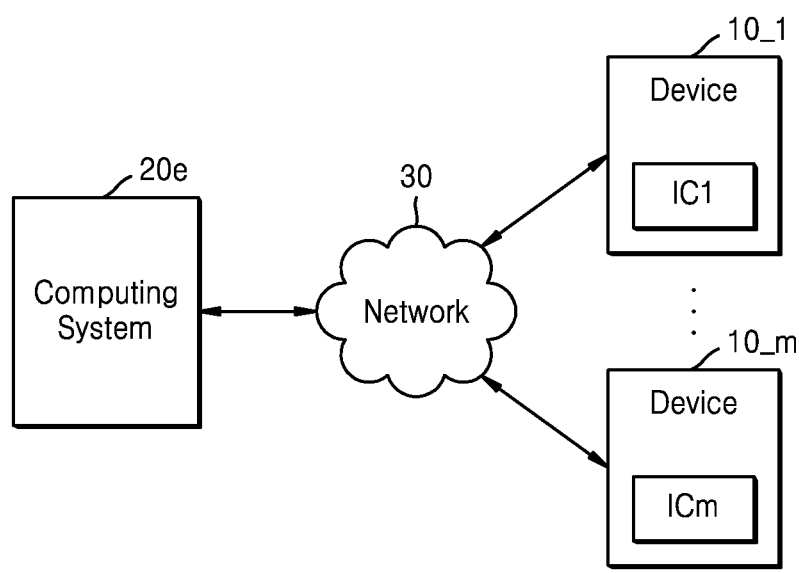

FIG. 14A and FIG. 14B are block diagrams illustrating an environment in which a security device according to an exemplary embodiment of the present disclosure is used. In detail, FIG. 14A illustrates an environment in which the security device is used in the enrollment process and FIG. 14B illustrates an environment in which the security device is used in a use process.

Referring to FIG. 14A, a host, for example, a computing system 20d operated by the manufacturer of first to mth integrated circuits IC1 to ICm may communicate with each of the first to mth integrated circuits IC1 to ICm (m is an integer greater than 1). For example, the computing system 20d may generate a validity map and helper data by controlling the first integrated circuit IC1 and may store the generated validity map and helper data in the first integrated circuit IC1. In an embodiment, each of the first to mth integrated circuits IC1 to ICm may operate in the enrollment mode by the method described in detail with reference to FIG. 1 to FIG. 13.

Referring to FIG. 14B, a computing system 20e may communicate with devices 10_1 to 10_m through a network 30. The computing system 20e may represent a certain system desiring to communicate with the devices 10_1 to 10_m through the network 30 by using encryption. The network 30 may include an arbitrary network and may include a cellular network, a local area network (LAN), or a wireless local area network (WLAN) as a non-limiting example. In addition, the computing system 20e may communicate with the devices 10_1 to 10_m through wired and/or wireless communications.

The devices 10_1 to 10_m may provide a key to the computing system 20e through the network 30 based on a validity map and helper data generated in the enrollment process and the computing system 20e may communicate with the devices 10_1 to 10_m by performing encryption by using the key. In an embodiment, each of the first to mth integrated circuits IC1 to ICm included in the devices 10_1 to 10_m may operate in the use mode by the method described in detail with reference to FIG. 1 to FIG. 13.

Figure 15:
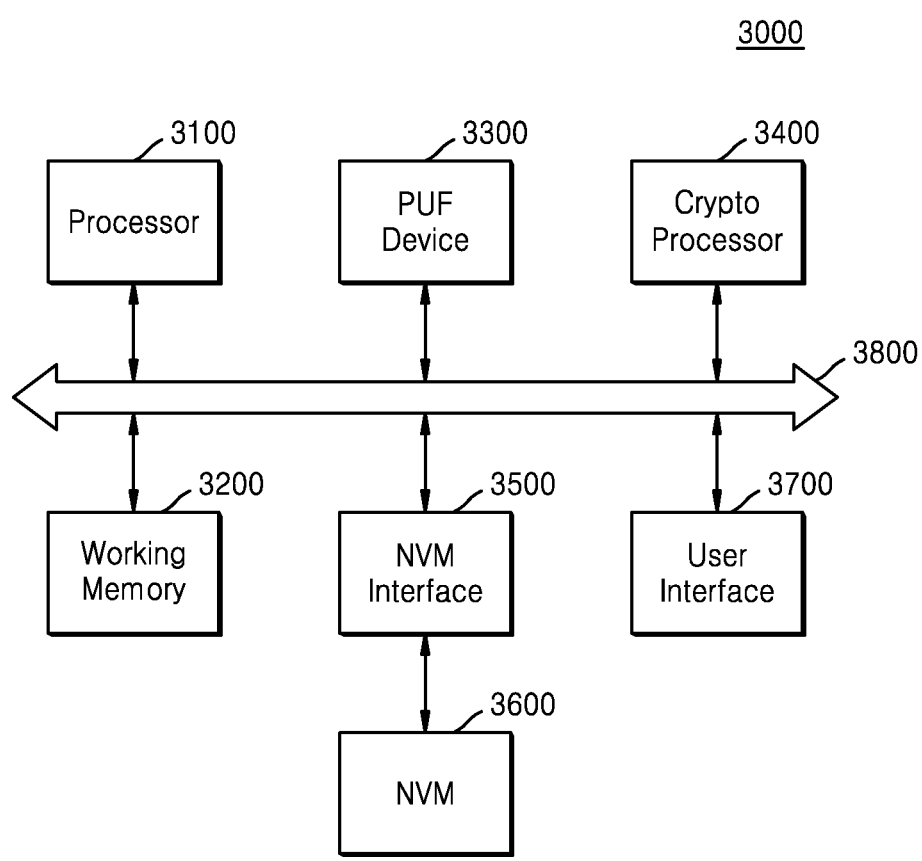
FIG. 15 is a block diagram illustrating a computing device according to an exemplary embodiment of the present disclosure.

FIG. 15 is a block diagram illustrating a computing device 3000 according to an exemplary embodiment of the present disclosure. In detail, FIG. 15 illustrates the computing device 3000 including the security device 10c described in detail with reference to FIG. 1 to FIG. 13.

Referring to FIG. 15, the computing device 3000 may include a processor 3100, a working memory 3200, a PUF device 3300, a crypto processor 3400, an NVM interface 3500, an NVM 3600, and a user interface 3700.

The processor 3100 may control an overall operation of the computing device 3000. The processor 3100 as a central processing unit (CPU) may perform various kinds of operations. For example, the processor 3100 may include one or more processor cores.

The working memory 3200 may exchange data with the processor 3100. The working memory 3200 may arbitrarily store data used for the operation of the computing device 3000. For example, the working memory 3200 may include high-speed memory such as dynamic random access memory (DRAM) or static RAM (SRAM).

The PUF device 3300 may be the PUF circuit 100 described in detail with reference to FIG. 1 to FIG. 13. The PUF device 3300 may generate a key required for security. The PUF device 3300 may be implemented by hardware, software, or firmware. The crypto processor 3400 may perform encryption and decryption operations by using the key output from the PUF device 3300.

The NVM interface 3500 may exchange data with the NVM 3600 in accordance with control of the processor 3100, the PUF device 3300, or the crypto processor 3400. The NVM 3600 may store data required to be kept regardless of power supply. In an embodiment, in the NVM 3600, the validity map and helper data described above with reference to FIG. 1 to FIG. 13 may be stored and the PUF device 3300 may not include the NVM therein.

The user interface 3700 may relay communications between a user and the computing device 3000 in accordance with the control of the processor 3100. The user interface 3700 may include an input interface such as a keyboard, a keypad, a button, a touch panel, a touch screen, a touch pad, a touch ball, a camera, a microphone, a gyroscope sensor, or a vibration sensor. Furthermore, the user interface 3700 may include an output interface such as a liquid crystal display (LCD), a light emitting diode (LED), an organic LED (OLED), an active matrix OLED (AMO-LED), a speaker, or a motor.

A bus 3800 may provide a communication path between the components of the computing device 3000. The components of the computing device 3000 may transmit and receive data to and from each other in accordance with a bus format. In an embodiment, the bus format may include a universal serial bus (USB), a small computer system interface (SCSI), a peripheral component interconnect express (PCIe), an advanced technology attachment (ATA), a parallel ATA (PATA), a serial ATA (SATA), a serial attached SCSI (SAS), or integrated drive electronics (IDE).

While the inventive concept(s) described herein have been particularly shown and described with reference to embodiments thereof, it will be understood that various changes in form and details may be made therein without departing from the spirit and scope of the following claims.

What is claimed is:

1. A security device, comprising:
   a physically unclonable function (PUF) block including a plurality of PUF cells that generate a plurality of first random signals and outputting the plurality of first random signals and a plurality of corresponding first inverted random signals each having a logic level opposite to that of each of the plurality of first random signals;
   an integrity detector determining data integrity of the plurality of first random signals by using the plurality of first random signals and the plurality of corresponding first inverted random signals; and
   a post processor generating a first row key that includes validity signals satisfying the data integrity and which are selected from the plurality of first random signals, generating helper data including parity data corresponding to the first row key based on a predetermined error correction algorithm, and generating by using the helper data a key for use which is based on a PUF from one of the plurality of PUF cells.

2. The security device of claim 1, further comprising:
   a validity detector generating a plurality of validity signals respectively corresponding to the plurality of PUF cells in a first mode based on validity of the plurality of first random signals; and
   a memory block storing a validity map,
   wherein the post processor further comprises an enrollment module generating the validity map for the PUF block based on the plurality of validity signals, selecting first valid random signals from the plurality of first random signals based on the validity map, and generating the first row key including the first valid random signals.

3. The security device of claim 2, the post processor further comprising:
   a key generator receiving a plurality of second random signals in a second mode, receiving the plurality of second random signals from the PUF block, receiving the validity map from the memory block, selecting second valid random signals from the plurality of second random signals based on the validity map, and generating a second row key including the second valid random signals in the second mode.

4. The security device of claim 3, wherein the PUF block further generates the plurality of second random signals and a plurality of corresponding second inverted random signals each having a logic level opposite to that of each of the plurality of second random signals in the second mode, and
   wherein the integrity detector determines data integrity of the plurality of second random signals by using the plurality of second random signals and the plurality of corresponding second inverted random signals in the second mode.

5. The security device of claim 3, further comprising:
   an encoding module generating the helper data in the first mode,
   wherein the memory block further stores the helper data.

6. The security device of claim 5, wherein the post processor further comprises:
   a decoding module receiving the second row key from the key generator, receiving the helper data from the memory block, and generating the key for use by performing error correction on the second row key based on the helper data in the second mode.

7. The security device of claim 6, wherein the first mode is performed once at a point in time at which the security device is manufactured, and
   wherein the second mode is performed when the key for use is to be generated by using the security device.

8. The security device of claim 5, the memory block further comprising:
   a non-volatile memory storing at least one of the helper data and the validity map generated in the first mode.

9. The security device of claim 8, the post processor further comprising:

a decoding module receiving the second row key from the key generator, receiving the helper data from the memory block, and generating the key for use by performing error correction on the second row key based on the helper data in the second mode, wherein the key generator reads the validity map from the non-volatile memory upon entering the second mode, and wherein the decoding module reads the helper data from the non-volatile memory upon entering the second mode.

10. The security device of claim 1, the post processor further comprising:
an interface block communicating with a counterpart outside of the security device and outputting the key for use outside of the security device.

11. The security device of claim 10, the interface block further comprising:
an attack detector including a first register that stores the first row key and determining whether the first register is attacked.

12. The security device of claim 11, wherein the attack detector further comprises:
an inverter generating an inverted key by inverting the key for use;
a second register storing the inverted key;
a comparator determining whether the first register and the second register are attacked by comparing the key for use with the inverted key; and
a key switch outputting the key for use outside based on a result of the comparator determining whether the first register and the second register are attacked.

13. A security device, comprising:
a physically unclonable function (PUF) block including a plurality of PUF cells that generates a plurality of first random signals and outputting the plurality of first random signals;
a validity detector generating a plurality of validity signals respectively corresponding to the plurality of PUF cells based on the plurality of first random signals in a first mode;
an enrollment module generating a validity map for the PUF block based on the plurality of validity signals, selecting first valid random signals from the plurality of first random signals based on the validity map, generating a first row key that includes the first valid random signals, and generating helper data including parity data corresponding to the first row key based on a predetermined error correction algorithm; and
a memory block storing the validity map and the helper data to be used when a key is generated based on a PUF from one of the plurality of PUF cells.

14. The security device of claim 13, further comprising:
an encoding module generating the helper data in the first mode.

15. The security device of claim 13, further comprising:
a key generator receiving a plurality of second random signals from the PUF block in a second mode, receiving the validity map from the memory block, selecting second valid random signals from the plurality of second random signals based on the validity map, and generating a second row key including the second valid random signals in the second mode.

16. The security device of claim 15, further comprising:
a decoding module receiving the second row key from the key generator, receiving the helper data from the memory block, and generating, by performing error correction on the second row key based on the helper data in the second mode, a key which is based on a PUF from one of the plurality of PUF cells.

17. The security device of claim 13, further comprising:
an interface block communicating with a counterpart outside of the security device and outputting a key for use outside of the security device.

18. The security device of claim 17, wherein the interface block further comprises:
a first register storing the key for use;
an inverter generating an inverted key by inverting the key for use;
a second register storing the inverted key;
a comparator determining whether the first register and the second register are attacked by comparing the key for use with the inverted key; and
a key switch outputting the key for use outside based on a result of the comparator determining whether the first register and the second register are attacked.

19. A security device, comprising:
a physically unclonable function (PUF) block including a plurality of PUF cells that generate a plurality of first random signals and outputting the plurality of first random signals;
an enrollment block generating a first row key by using the plurality of first random signals in a first mode;
an encoding module receiving the first row key, obtaining parity data by performing error correction on the first row key, and generating helper data including the parity data;
a memory block storing the helper data;
a key generator receiving a plurality of second random signals from the PUF block in a second mode, and generating a second row key by using the plurality of second random signals; and
a decoding module receiving the second row key from the key generator, receiving the helper data from the memory block, and generating a key for use by performing error correction on the second row key based on the helper data.

* * * * *